United States Patent Office 3,319,145
Patented May 9, 1967

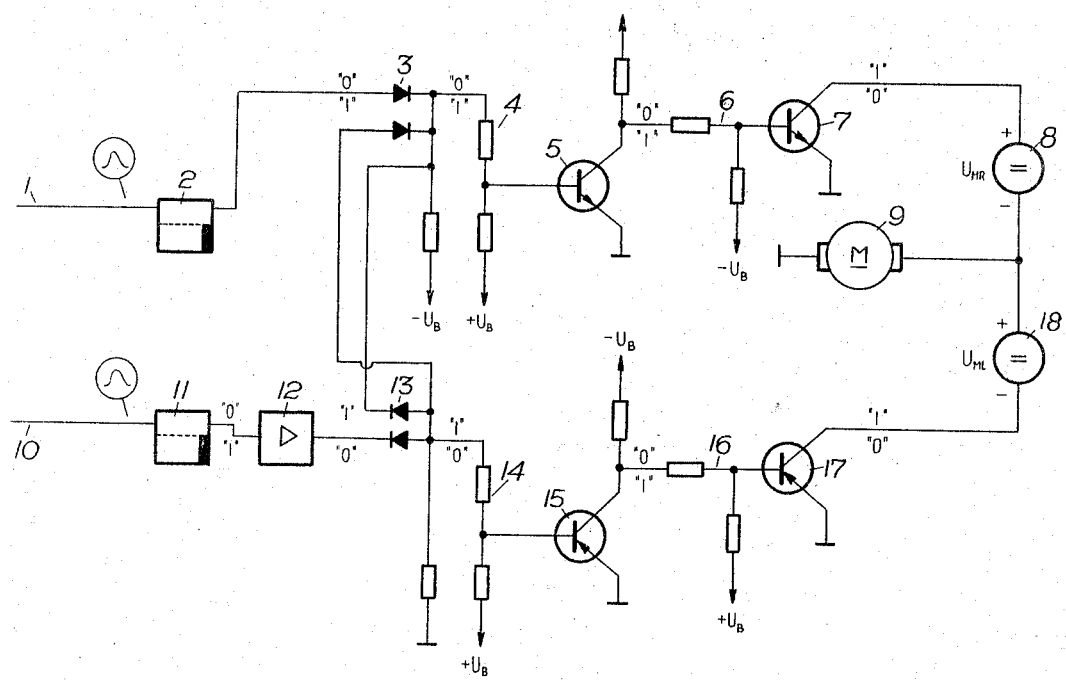

3,319,145
DEVICE FOR THE CONTACTLESS REVERSAL OF CURRENTS IN ELECTRICAL MOTOR DRIVE COILS
Kurt Wiederwohl and Reimar Germann, Graz, Austria, assignors to Hans List, Graz, Austria
Filed Feb. 4, 1965, Ser. No. 430,349
Claims priority, application Austria, Feb. 5, 1964, A 938/64
1 Claim. (Cl. 318—287)

The invention relates to a device for the contactless reversal of the flow of currents in electrical hardware, in particular for the reversal of currents in armature or field coils of direct-current motors or generators for obtaining a reversal of the sense of rotation with one control circuit for one direction of the current and a second control circuit for the opposite direction of the current.

In the field of control engineering the necessity of reversing the flow of currents in rheostats, inductances and other structural elements arises frequently. The conventional means formerly used for the purpose, such as relay switches and contactors, have in many practical instances proved unsuitable or unsatisfactory since in particular, switching operations of great frequency and high speeds resulted in the premature burning-off of contacts and other symptoms of wear jeopardizing the reliability of similar devices for the reversal of currents.

Progress made in the field of electronic control was therefore, accompanied by efforts to solve the problem of current reversal by electronic means, that is, by the use of contactless control elements. One result of this development was an electronic control arrangement for the reversal of the direction of currents in direct-current motors comprising a separate control circuit for each direction of the current. The motor whose sense of rotation is to be altered by the reversal of the direction of the current is fed from a direct-current supply. In the two control circuits for the right-hand or left-hand run of the motor two transistors and two rheostats each are connected with the motor in series. The drawback of this type of motor feed resides in the fact that the presence of series resistances results in objectionable control properties in addition to the obviously higher feed voltage required. This increases the power loss considerably, so that the applications of these conventional control arrangements are rather limited. Moreover, they do not permit of regulating motor speeds in any sense of rotation.

Another conventional control arrangement provides for the reversal of the sense of rotation of direct-current motors with the aid of two exciter coils. The energizing current flows through one exciter coil for a certain sense of rotation and through the other for the opposite direction of rotation. It is therefore, not possible to use this conventional control device for ordinary direct-current motors comprising a single exciter coil only. The same holds true for direct-current motors featuring permanent energization where the polarity of the flow of the current is reversed in a manner known per se for the purpose of altering the sense of rotation.

It is the object of the invention to eliminate the shortcomings of conventional control arrangements by the provision of a device for the contactless reversal of currents of inexpensive design and of an allround suitability for the aforementioned uses. In order to achieve this aim, the invention provides for a pulse shaper stage for the input signals connected in a manner known per se with the input of each control circuit and followed, with the interpolation of a reversing stage in the second control circuit, by control stages via negative and positive and-gate respectively, and one basis divider each, the latter control stages controlling output stages via additional basis dividers, the latter forming in conjunction with one direct-current supply each and with the hardware wherein the flow of the current is to be altered, circuits traversed in opposite directions, both of the control stages and the following output stages of the first control circuit being equipped with n-p-n transistors and the control stage as well as the following output stage of the second control circuit with p-n-p transistors, whereas the negative and-gate of the first control circuit is connected with the positive and-gate of the second control circuit. The device according to the invention is particularly suitable for the reversal of the sense of rotation of direct-current motors of every description by means of the contactless reversal of the armature current and/or of the flow of the current in the exciter coil. In each case motor speed regulation is possible. When applied to direct-current generators, the device according to the invention easily permits contactless polarity reversal of the voltage available at the machine terminals. The plain and clear layout of the control arrangement according to the invention ensures in all cases a high degree of operation safety and dependability.

Further details of the invention will appear from the following description of the reversal of the sense of rotation of a direct-current motor with reference to the accompanying circuit diagram.

The device comprises two control circuits, the one designated by reference numbers 1 to 8 controlling the right-hand run and the other, designated by reference numbers 10 to 18 the left-hand run of the controllable direct-current motor 9 connected therewith. In both control circuits the alternatively possible control conditions are designated by reference numbers "0" and "1," respectively.

In the control circuit for the right-hand run a pulse shaper stage 2, e.g., a Schmitt trigger is followed via a negative and-gate 3 and a voltage divider 4 by a control stage 5 formed by an n-p-n transistor. Via an additional basis divider 6 the latter controls the output stage 7 also consisting of an n-p-n transistor. The output stage 7 together with a direct-current supply 8 and the armature circuit of the motor 9 constitute the circuit for the right-hand run of the motor.

Likewise, the input of the control circuit for the left-hand run consists of a pulse shaper stage 11 controlling a control stage 15 via a reversing stage 12, a positive and-gate 13 and the basis voltage divider 14, the said control stage being formed by a p-n-p transistor. Via another basis divider 16 the control stage 15 controls an output stage 17 consisting of a p-n-p transistor. The said output stage in conjunction with another direct-current supply 18 and the armature circuit of the motor 9 produces a second circuit of opposite direction for the left-hand run of the motor 9. In order to prevent the simultaneous actuation of the motor 9 for right-hand and left-hand run, the negative and-gate 3 of the control circuit for the right-hand run and the positive and-gate 13 of the control circuit for the left-hand run are interconnected. The direct-current supplies 8 and 18 are of opposite polarity so that the direction of the current associated with the motor circuit 7, 8, 9 for the right-hand run is opposed to the direction of the current associated with the circuit 17, 18, 19 for the left-hand run.

For the reversal of the direction of the current and consequently, for the alteration of the sense of rotation of the motor 9 the control stage 5 or the other control stage 15 is fed alternatingly by appropriate control pulses. If, however, the transistors of the two control stages 5 and 15 are locked, the flow of current is zero, just as if two relays had been used. Thus both the time-phases of the positive and/or negative current flow and the blocking phase of the absence of current are determined by the preset control signals. The input signals which can be of any desired shape and duration, are merely required to exceed the responsiveness of the subsequent pulse shaper stages 2 and 11, respectively. In the pulse shaper stages the input signals are converted into signals of uniform amplitude and rise-time. The transistors of the two output stages 7 and 17 respectively, are required to have a blocking voltage in excess of the total of the two motor voltages for right-hand run $U_{MR}$ and left-hand run $U_{ML}$.

In principle, the sense of rotation of the motor 9 can be reversed by an exchange of terminals. The circuit diagram shows for each control condition the signals for all points of control.

What we claim is:

A device for the contactless reversal of currents in the drive coils of direct-current electrical motors, comprising two separate control circuits for opposite directions of the current, one of said control circuits comprising a pulse shaper stage receiving input signals for the said first control circuit, a negative and-gate following the said pulse shaper stage, a voltage divider connected to the said negative and-gate, a control stage subsequent to the said voltage divider and formed by an n-p-n transistor, an output stage connected to the said second voltage divider and formed by a n-p-n transistor, the output of this output stage being connected to the positive pole of a direct-current supply, the negative pole of same being connected to the said motor drive coils the direction of the current of which is to be reversed, the second of the said control circuits comprising a pulse shaper stage receiving input signals for the said second control circuit, a reversing stage following the last-mentioned pulse shaper stage, a positive and-gate after the said reversing stage, a voltage divider connected to the said positive and-gate, a subsequent control stage formed by a p-n-p transistor, an additional voltage divider connected to the last-mentioned control stage, an output stage after the last-mentioned voltage divider, comprising a p-n-p transistor, the output of the said output stage of the second control circuit being connected to the negative pole of another direct-current supply, the positive pole of the same being connected to the said motor drive coils the direction of the current of which is to be reversed, and further comprising two transfer circuits connecting the said negative and-gate of the first control circuit with the said positive and-gate of the second control circuit.

No references cited.

ORIS L. RADER, *Primary Examiner.*

G. SIMMONS, *Assistant Examiner.*